April 26, 1949.  B. MARTIN  2,468,679
EPISCOPIC PROJECTION APPARATUS WITH
BRILLIANT ILLUMINATION MEANS
Filed April 29, 1946  5 Sheets-Sheet 1
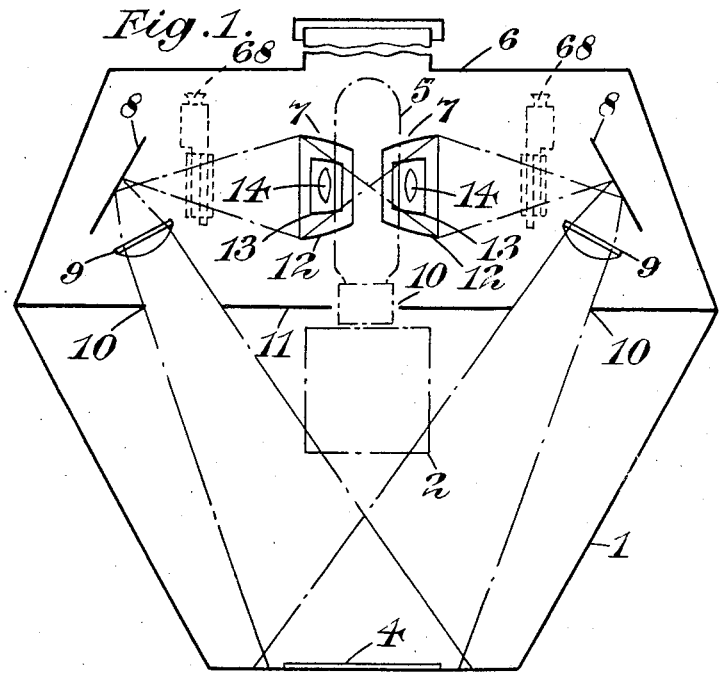
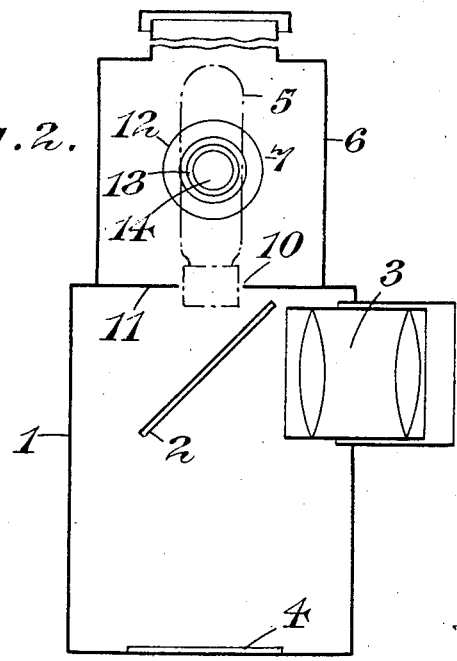
INVENTOR
Bruce Martin
By Watson, Cole, Grindle &
Watson
ATTYS

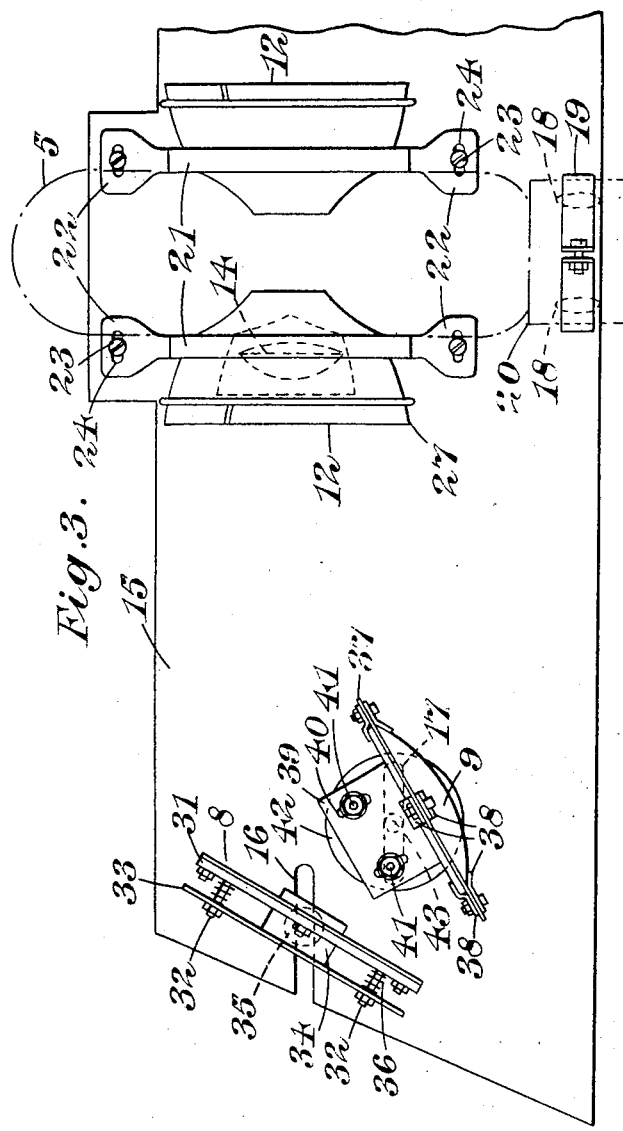

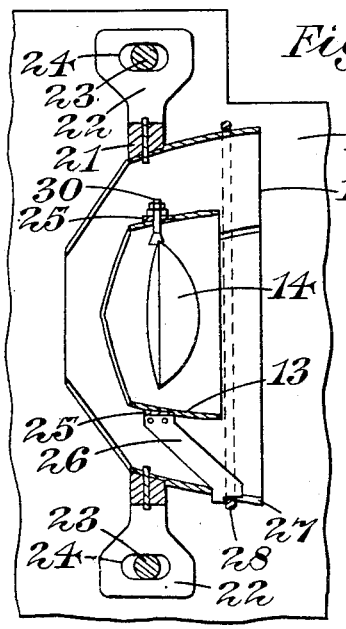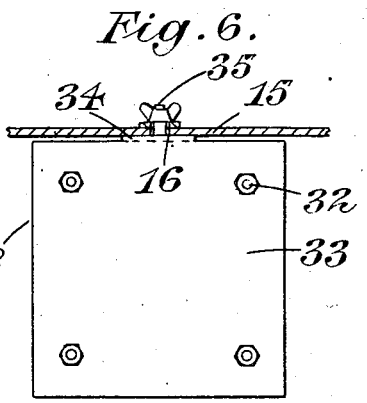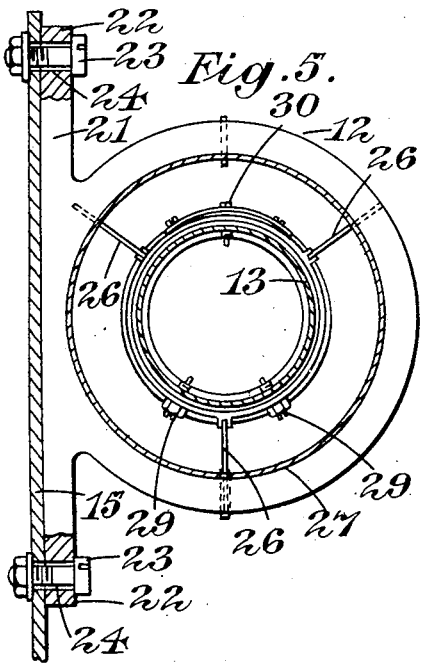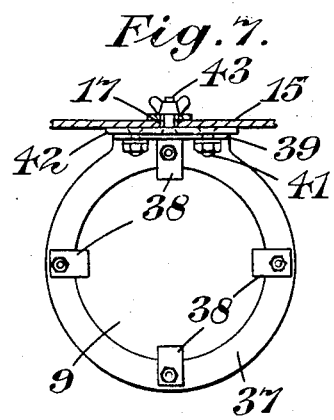

April 26, 1949.                B. MARTIN                    2,468,679
            EPISCOPIC PROJECTION APPARATUS WITH
                  BRILLIANT ILLUMINATION MEANS
Filed April 29, 1946                              5 Sheets-Sheet 4
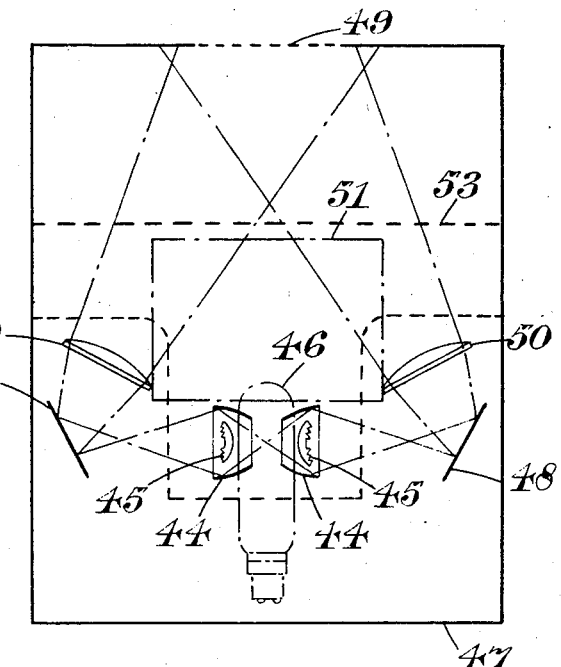
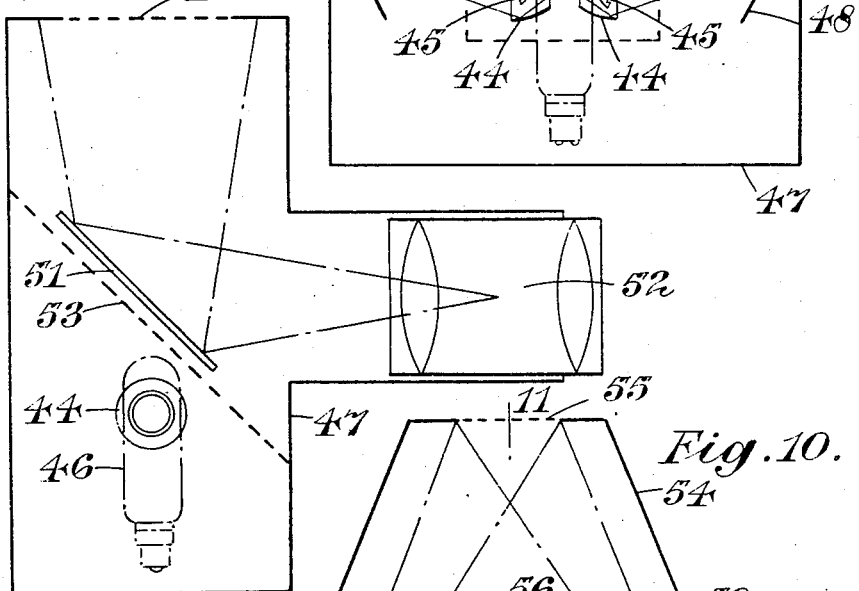
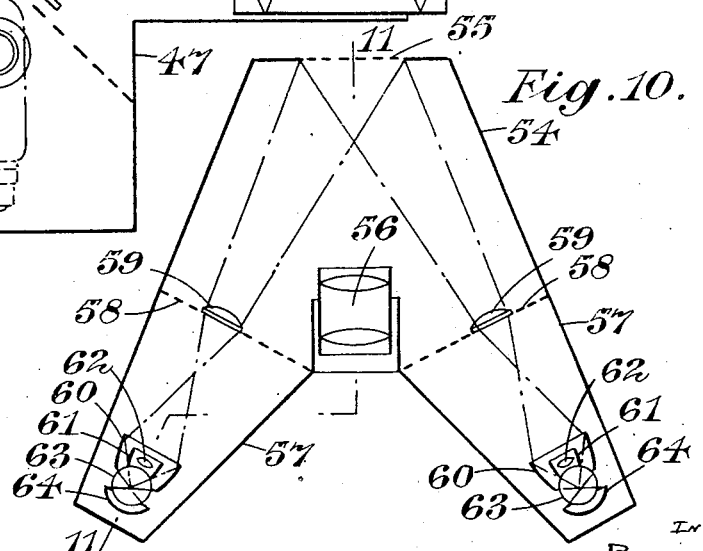
Inventor
Bruce Martin
By Watson, Cole, Grindle &
Watson
ATTYS April 26, 1949.  B. MARTIN  2,468,679
EPISCOPIC PROJECTION APPARATUS WITH
BRILLIANT ILLUMINATION MEANS
Filed April 29, 1946  5 Sheets-Sheet 5
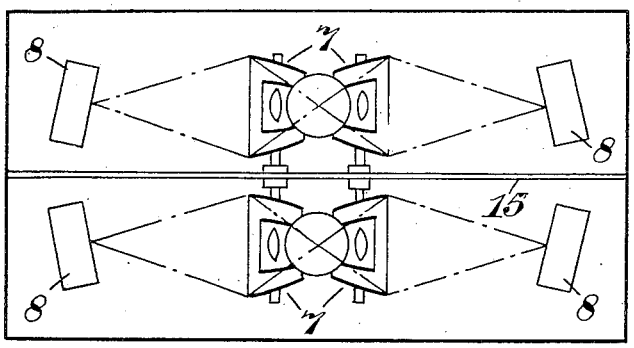
Fig. 13.
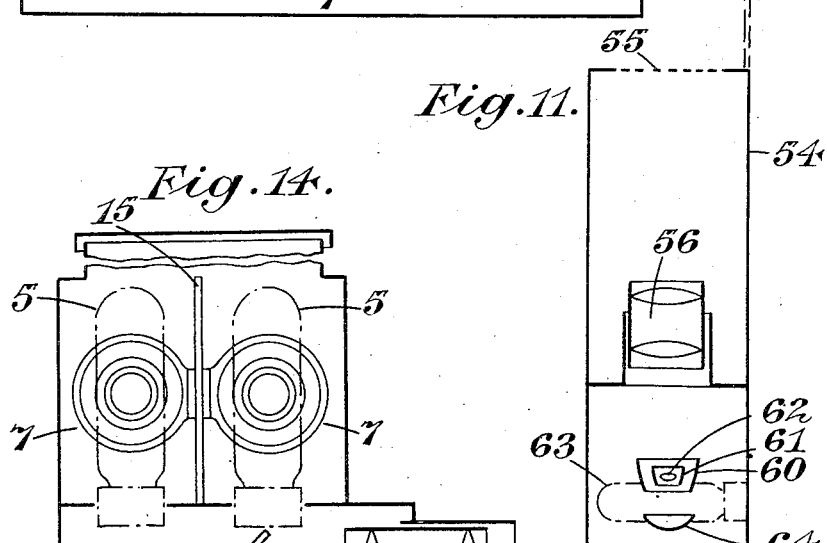
Fig. 11.
Fig. 14.
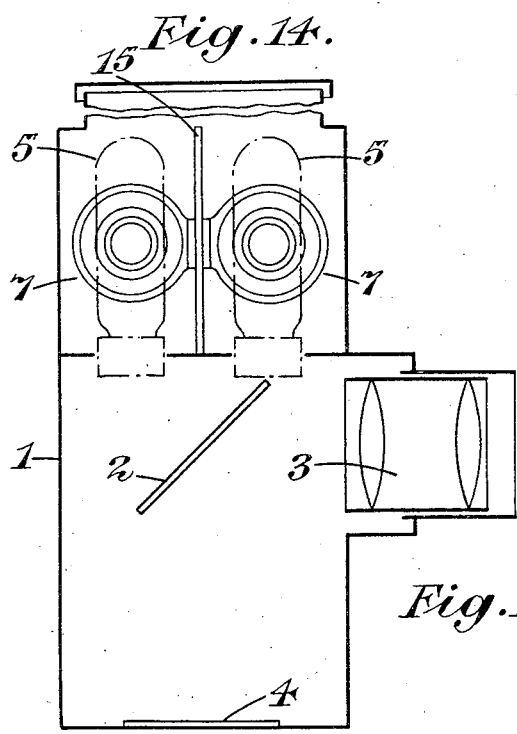
Fig. 12.
INVENTOR
Bruce Martin
By Watson, Cole, Grindle & Watson
ATTYS Patented Apr. 26, 1949

2,468,679

UNITED STATES PATENT OFFICE 2,468,679

EPISCOPIC PROJECTION APPARATUS WITH BRILLIANT ILLUMINATION MEANS

Bruce Martin, Chatham, England

Application April 29, 1946, Serial No. 665,821
In Great Britain April 30, 1945

2 Claims. (Cl. 88—24)

This invention relates to improvements in episcopic projection.

In episcopic projection the surface of an object such as a sheet of print, a drawing, a diagram, picture, or even a solid object is brilliantly illuminated, and the reflected image of the object is directed and focused by means of an optical system, including an objective lens, upon a suitable reflecting screen.

This method of projection offers considerable advantages over diascopic or "magic lantern" projection, inasmuch as translucent slide preparation is unnecessary, and photographic positives can thus be projected readily for examination purposes with considerable enlargement, only limited by the resulting illumination intensity and visibility upon the screen.

In the known types of episcopic projector, illumination of the object is normally effected by one or more incandescent filament lamps mounted closely adjacent to the object, and co-operating with one or more reflecting mirrors of such a type, and so arranged as to flood the object with light to the best advantage.

This flood lighting system is by no means fully efficient for the purpose in view, one serious disability being that the average angle of incidence of the illuminating beam upon the surface of the object is a large one by comparison with that required to produce maximum reflection, which would actually require the rays of light to be normal to the surface of the object.

Having regard, moreover, to the nature of most objects, the necessity for their intense illumination, and the space restrictions incidental to the use of an episcopic projector of normal size and cost, the lamp or lamps constituting the source of illumination must necessarily be of considerable capacity (500 watts being common practice). There is consequently radiated and projected such intense heat as well as light upon the object that a very limited exposure period is possible, more especially in the case of prints, pictures, or objects of appreciable value, which are sensitive to overheating. In this connection it is known that valuable objects have at times actually caught fire under such conditions when inadvertently exposed for a period of even a few minutes.

Where no further increase in illumination appears possible in relation to normal episcopic flood lighting systems, owing to this serious overheating risk, and also having regard to the low illumination efficiency, it is not surprising that in relation to a sufficiently large episcope screen for satisfactory observation by a reasonable number of persons in a small hall or lecture room, the screen illumination intensity is generally poor, and unsatisfactory for the purpose in view.

This invention, therefore, has among its objects to provide episcopic illumination of considerably increased intensity from any given light source without dangerous heat concentration, to provide a still further increase in illumination intensity and/or screen surface area, by utilising a light source of larger capacity, and still without dangerous heat concentration upon the object and to provide an improved episcopic projector.

According to the invention the object is illuminated by light from a source or sources remote therefrom and projected thereon by an optical system or systems as a beam or beams that may be focused in such a manner as to ensure uniform distribution over the whole area of the object. A splotlighting rather than a flood-lighting optical system is therefore used to project a beam or beams and such system preferably comprises one or more efficient optical collecting and projecting systems each consisting of a frontally disposed ellipsoidal reflector or reflectors co-operating with a centrally mounted refracting lens.

The invention further comprises the features of construction hereinafter described.

The invention is illustrated, by way of example, in the accompanying diagrammatic drawings.

Figure 1 is a diagrammatic elevation of an episcope provided with twin optical projecting systems having a common source of light.

Figure 2 is a diagrammatic elevation at right angles to Figure 1.

Figure 3 is a part elevation in illustration of a construction of the twin optical system of the episcope represented in Figures 1 and 2 and of the manner of mounting the elements, to an enlarged scale.

Figure 4 is an axial-section of an optical system as illustrated in Figure 3, to an enlarged scale.

Figure 5 is a cross-section corresponding to Figure 4.

Figure 6 is a plan view of the mounting for the deflecting reflectors represented in Figure 3.

Figure 7 is a plan view of the mounting for the objective lenses represented in Figure 3.

Figure 8 is a diagrammatic elevation of a construction of small episcope.

Figure 9 is a diagrammatic elevation at right angles to Figure 8.

Figure 10 is a diagrammatic plan of a further construction of episcope.

Figure 11 is a diagrammatic elevation on the line 11—11 of Figure 10.

Figure 12 is a diagrammatic plan, in part, of a further construction of episcope.

Figure 13 is a diagrammatic plan of a modification of construction of the episcope represented in Figures 1 and 2.

Figure 14 is a sectional elevation corresponding to Figure 13.

In carrying the invention into effect in the manner represented in Figures 1 and 2 of the accompanying drawings, a casing or housing 1 is provided to receive in the upper part a plane mirror 2 set at an angle of 45° to the horizontal on the optical axis of an objective lens 3 adjustably positioned in a vertical wall of the casing and serving to project the image of the object 4 deposited on the base of the casing 1 upon a vertical screen set in a suitable position. Such features of the apparatus are conventional. It is customary to intensely illuminate the object 4 by a source of light set in close proximity within the casing 1. In the construction of apparatus under description the source of light 5 is positioned within an upper casing 6 and is associated with twin optical projecting systems 7 set in opposed positions with their optical axes in alignment and co-operating respectively with plane mirrors or reflecting surfaces 8 set at such an angle to the common optical axis that the two beams from the systems 7 are deflected downwardly at an angle of about 30° from the vertical and transmitted by objective lenses 9 through corresponding apertures 10 in the plate or plates 11 defining the top of the casing 1 and the base of the casing 6 to converge upon the object. The full angle between the two beams of about 60° is dependent on the size of the plane mirror 2 and its position in relation to the object 4 beneath it. As the said angle is decreased to the permissible minimum so the illumination of the object is rendered more effective. If the object is faced by a glass or like plate the said angle must not be decreased to an extent such that the surface of the glass or the like reflects upon the mirror 2 and thence upon the objective lens any portion of either of the projected beams.

The two focused and converging beams respectively illuminate the object over an area that is not circular, but they may together readily be adjusted to compensate any deficiency in illumination from either one of them and to co-operate in such a manner as efficiently to provide suitably even illumination of the whole of the object where required.

Each of the optical projecting systems 7 advantageously may comprise a frontal ellipsoidal reflector 12 truncated forward of the focal plane, an inner concentric truncated ellipsoidal reflector 13 and a refractor 14 concentrically disposed within the reflector 13. The reflector 12 is sectored at the upper and lower parts on the vertical axial plane to accommodate the envelope of the incandescent projection lamp 5 forming the source of light and to permit the focal point of the reflector to be suitably positioned in relation to the lamp filament. If necessary, the reflector 13 may be similarly sectored. A convergent beam is projected by such light collecting and projecting elements upon the associated mirror or reflector 8, for reflection through the objective lens 9 upon the object 4.

With such an arrangement, not only are two intense focused spotlighting beams concentrated upon the object with high illumination efficiency, but they are derived from one common source of both light and heat mounted externally upon the main casing of the episcope. Under these conditions, owing to the cooling and ventilating arrangements normally provided for the lamp, and the heat absorption effects upon the beams as they meet or pass through the various reflectors or refractors, much increased and otherwise satisfactory illumination of the object can be secured without any serious rise in temperature upon the surface thereof. It is observed that the usual high ambient temperature in the normal episcope casing due to the considerable heat emanation from the lamp which is not actually projected upon the object is avoided according to this invention, by the external mounting of the optical system or systems.

In an example of a practical construction of such an episcope, as illustrated in Figures 3 to 7 of the accompanying drawings, within the casing 6 there is mounted a supporting plate or frame 15 flanged at the lower edge and slotted parallel with the said edge at 16 and 17. Slots 18 formed on parallel vertical lines serve for the reception of the parts of a clip 19 for the holder 20 for the lamp 5. Each ellipsoidal reflector 12 is pinned in a seating in an annular support 21 having laterally disposed upwardly and downwardly extending lugs 22 by which it is secured to the plate or frame 15 by fixing screws, bolts or studs 23 that extend through transverse slots 24 in the lugs 22, whereby a limited degree of adjustment of the reflector 12 in the direction of the optical axis is rendered possible. Each reflector 13 is similarly carried in an annular support 25 that is mounted concentrically in the reflector 12 by means of radial arms 26, the outer ends of which are received in slots 27 formed in the forward edge of the reflector 12 and retained in position by a spring wire ring 28. Each refracting lens 14 is in turn supported within the reflector 13 by radial supporting pins 29 screwed into the supports 25 and by a spring-mounted pin 30.

Each reflector or mirror 8 is mounted in a supporting frame 31 having four, but preferably three, rearwadly directed and equally spaced screwed studs or bolts 32 that are received in clearance holes in a supporting plate 33 having a flange or foot 34 carrying a centrally disposed fixing bolt or stud 35 that is engaged in one of the slots 16 of the plate or frame 15. Thus, the distance of the reflector or mirror 8 from the reflector 12 may be readily adjusted by moving the bolt or stud 35 along the slot 16 while the angle of incidence of the beam from the reflector 12 and the associated elements may be varied by rotary adjustment of the supporting plate about the axis of the bolt or stud 35. Minor adjustments of the plane in which the reflector or mirror 8 is disposed may be effected by tightening or loosening the nuts of the studs or bolts 32 against the pressure of the helical compression springs 36.

Each objective lens 9 is mounted in an annular frame 37 by means of spring clips 38. The frame 37 has a flanged base 39 provided with slots 40 to receive screwed studs or bolts 41 fixedly mounted in a disc-like plate 42 having a centrally disposed fixing screw or bolt 43 for reception in one of the slots 17 of the plate or frame 15. Such mounting of the lens 9 permits of ready adjustment of the angle of the lens in relation to the beam reflected by the reflector or mirror 8 according to the position of the latter and also of slight adjustment in the axial direction of the lens.

A satisfactory arrangement for a small and compact episcope may comprise, as illustrated in Figures 8 and 9, two optical systems each consisting of a truncated ellipsoidal reflector 44 concentrically disposed in relation to a refractor 45, preferably of prismatic form. These optical systems are oppositely directed and disposed coaxially to cooperate with a common projection lamp 46 and are set in the lower part of the episcope casing 47 so that the oppositely directed beams may fall upon corresponding deflecting mirrors or reflectors 48 whereby the beams are projected in the direction of a transparent glass or other panel 49 at the middle of the upper part of the casing 47 through focusing objectives 50. The panel 49 serves as a support for the object, which is disposed upon the panel face downwards, either directly or while carried in an enclosure with a transparent surface. The panel 49 may be provided with a backing plate to press the object into close contact with the panel. The plane mirror 51 for reflecting the image of the object upon the objective lens 52 is also set in the casing. The heat from the lamp 46 may be directed from the object by an inclined reflector or partition, such as 53.

While the objects of the invention are best attained by constructional arrangements such as those hereinbefore described, it will be understood that it is possible to secure results superior to those provided by the episcopes generally in use by using an optical system or systems which while exterior to the casing of the episcope project a beam directly through a corresponding objective lens upon the object to be illuminated.

Such a construction is represented in Figures 10 and 11, in which the episcope casing 54 is adapted to be set horizontally. The object is positioned against a transparent panel 55 at the middle of the rear wall of the casing and the objective lens 56 is set in the front wall of the casing with the optical axis horizontal. The casing is provided with lateral compartments 57 extending forwardly at an angle determined by the angle of incidence of the beams projected upon the panel 55 from the optical systems respectively disposed in the compartments 57, which may be divided from the main casing by partitions 58 which may serve adjustably to support the respective objective lenses 59 of the optical systems. The latter are indicated as comprising the concentric truncated ellipsoidal reflectors 60 and 61 with axial refractors 62, suitably disposed in relation to the respective lamps 63, and the rear reflectors 64 of segmental spherical form. The transparent panel 55 may be associated with or replaced by a hinged or removable carrier 65 which may therefore receive the object while in the horizontal position.

In a further example of such a construction, illustrated in Figure 12, parabolic reflectors 66 are indicated as associated with an electric arc as the source of light, the electrodes 67 being set axially. In such a construction the lateral compartments 57 are not essential, since, as illustrated, the reflectors 66 may be positioned laterally of the objective lens 56. If the compartments 57 are present, however, the source of light may be set at a more remote position in relation to the object with consequent advantages as regards the effects of heat upon the object.

Again, the invention is not limited to the use of two optical systems such as are hereinbefore described. For example, two pairs of optical systems each having a source of light may be provided and by the use of high efficiency projection lamps it is possible to secure a further considerable increase in illumination intensity, without prejudicial concentration of heat upon the object. Thus, it will be evident that the construction represented in Figures 1 and 2 may be readily adapted for the purpose, as illustrated in Figures 13 and 14, by the duplication of the twin optical systems 7, which may be positioned, for example, on the two sides of the supporting plate 15 (Figure 3), the mirrors or reflectors 8 being rotatably adjusted about the respective optical axes to the slight extent necessary to direct the respective beams upon the object 4, the objective lenses 9 being correspondingly adjusted in position.

The episcopes according to the invention may be adapted for use with sources of light of differing character and intensity according to the requirements of particular applications. Thus, the projection lamp for which the episcope represented in Figures 1 and 2 is primarily intended is one of a capacity of, for example, from 500 to 1000 watts, with a diameter of bulb of the order of 64 mm., whereas in the small episcope represented in Figures 8 and 9 the lamp illustrated is a special projection lamp of 400 watt capacity and having an envelope of 32 mm. diameter. These constructions are equally adapted for use with projection lamps of the mercury vapour discharge type. Alternatively, the construction represented in Figures 1 and 2 may be used with a high intensity alternating current arc in which the electrodes are set in alignment at right angles to the common optical axis. It is thus possible to obtain much more intense illumination permitting of the use of larger screens and/or longer throws.

In the use of the optical systems illustrated in Figures 1 and 2 and 8 and 9 of the drawings it is unnecessary to adopt measures for cooling the object or the beams so long as the capacity of the source of light does not exceed 1000 watts. Thus, in the construction represented in Figures 1 and 2, a 1000 watt incandescent lamp, in comparsion with a 500 watt lamp as commonly used, gives approximately three times the illumination on the screen with no appreciable rise in temperature at the position of the object. Where cooling is throught to be advisable it may be effected by the use of cooling cells, using air, water or other gas or liquid, interposed, for example, between the optical systems 7 and the mirrors or reflectors 8, as indicated in dotted lines in Figure 1, at 68. When, as in the case of the apparatus represented in Figures 13 and 14, there are used two projection lamps of considerably more than 1000 watts in total capacity, a simple system of cooling by means of a fan adapted to direct cold air over the surface of the object may be used. The use of an arc, as hereinbefore described, if of sufficient capacity might result in the projection in the focused beams of so much heat as well as light from the arc that air cooling might be inadequate and cooling cells should accordingly be provided. They may be operated by thermo-syphonic circulation through a storage tank of suitable capacity and adapted if necessary for auxiliary cooling, but where desirable pressure circulation may be adopted by the use of a suitable pump or under the pressure of a main water supply.

The episcope constructions according to the invention are applicable for operation with a wide range of diverse objects. Thus, they may be applied to the episcopic magnification of screen images produced cinematographically or of a cathode ray image, such as is produced by radar equipments or in television, such images occupying the position of the object. They may also be applied to photographic enlargements.

In all applications of the invention employing optical systems, such as are represented in Figures 1 and 2 or 8 and 9, the illumination of the object or the object plane may be controlled as regards uniformity or otherwise by adjustment of the position of the focusing objective lenses in relation to the conjugate foci of the ellipsoidal reflectors of the optical systems. The beam projected by such a system is, at the conjugate focus, very bright at the centre with a falling off in intensity towards the outer zone, whereas in a plane nearer to the reflectors the intensity of illumination is uniform or closely approaches uniformity. It is therefore desirable that the objective lenses should be constructed and mounted so that they may at will be focused upon the plane of uniformity or upon a plane nearer to the corresponding conjugate focus. It is thus possible to secure uniform illumination over the whole of the area to be occupied by the object or else a higher intensity in the central zone as may be desirable according to the size and nature of the object the image of which is to be projected.

I claim:

1. Apparatus for the episcopic projection of the images of objects, comprising a housing, a partition across the housing to form upper and lower compartments, in the lower compartment, a support for the object, and a plane reflector, an objective lens for projecting upon a receiving surface exterior to the housing the image of the object reflected thereto by the plane reflector and, in the upper compartment, a source of light, two similar optical projecting systems set in opposed positions with a common focal point at which the light source is set, plane reflectors receiving the respective beams from the optical systems and reflecting them convergently through apertures in the partition in the direction of the support for the object and interposed adjustable objective lenses determining the quality and nature of the illumination of the object.

2. Apparatus for the episcopic projection of the images of objects, comprising a housing, a transparent panel in a wall of the housing forming a support for the object disposed exterior to the housing, an objective lens supported in a second wall of the housing and, within the housing, a plane reflector set to reflect the image of the object to the objective lens for projection to a receiving surface exterior to the housing, a source of light, two similar optical projecting systems set in opposed positions with a common focal point at which the source of light is set, plane reflectors receiving the respective beams from the optical systems and reflecting them convergently in the direction of the panel and interposed adjustable objective lenses determining the quality and nature of the illumination of the object.

BRUCE MARTIN.

REFERENCES CITED

The following references are of record in the file of this patent:

UNITED STATES PATENTS

| Number | Name | Date |
| --- | --- | --- |
| 961,947 | Fulgora et al. | June 21, 1910 |
| 1,085,795 | Boyle | Feb. 3, 1914 |
| 1,202,754 | Patterson | Oct. 24, 1916 |
| 1,460,071 | Merriman | June 26, 1923 |
| 1,807,614 | Bauersfeld et al. | June 2, 1931 |
| 1,842,855 | Bernard | Jan. 26, 1932 |
| 2,195,425 | Roger | Apr. 2, 1940 |

FOREIGN PATENTS

| Number | Country | Date |
| --- | --- | --- |
| 22,934 | Great Britain | 1912 |